Jan. 7, 1947.  O. R. WIKANDER  2,413,740
SHOCK ABSORBER
Filed June 25, 1943

INVENTOR
Oscar R. Wikander
by Stebbins and Stebbins
his attorneys

Patented Jan. 7, 1947

2,413,740

UNITED STATES PATENT OFFICE 2,413,740

SHOCK ABSORBER

Oscar R. Wikander, Pittsburgh, Pa., assignor to Edgewater Steel Company, Oakmont, Pa., a corporation of Pennsylvania Application June 25, 1943, Serial No. 492,241

7 Claims. (Cl. 267—1)

This invention relates to shock absorbers. It relates more particularly to shock absorbers adapted for application between a base and a device to be mounted on the base to absorb shocks and vibrations imparted to the base, thereby protecting the device against damage.

The invention further relates to what I call an all-directional shock absorber capable of absorbing shocks or vibrations regardless of the directions of the forces causing them. I preferably employ a friction spring which takes up in internal friction (i. e. transforms into heat) a substantial part of the shock force. I find that a friction spring of the well known ring spring type is highly satisfactory for the purpose. However other types of springs may be employed and may be particularly desirable for certain uses. For example, I may utilize a coil spring either in tension or in compression. I prefer to employ a compression spring; a ring spring acts solely in compression.

I preferably provide a shock absorber comprising a spring, a mounting for the spring comprising two relatively movable members one engaging each end of the spring, the spring opposing relative movement between said members in one direction, and two portions one adapted for connection with a base and the other with a device to be mounted on the base, said portions having means engaging said members to relatively move the latter in the direction opposed by the spring to stress the spring upon relative movement of said portions in any direction. Preferably said means engages said members to relatively push said members in the direction opposed by the spring to stress the spring upon relative movement of said portions in one direction and to relatively pull said members in the direction opposed by the spring to stress the spring upon relative movement of said portions in the opposite direction. Said means preferably also relatively moves said members in the direction opposed by the spring to stress the spring upon relative movement of said portions transversely of the spring.

Other details, objects and advantages of the invention will become apparent as the following description of a present preferred embodiment thereof proceeds.

Figure 1:
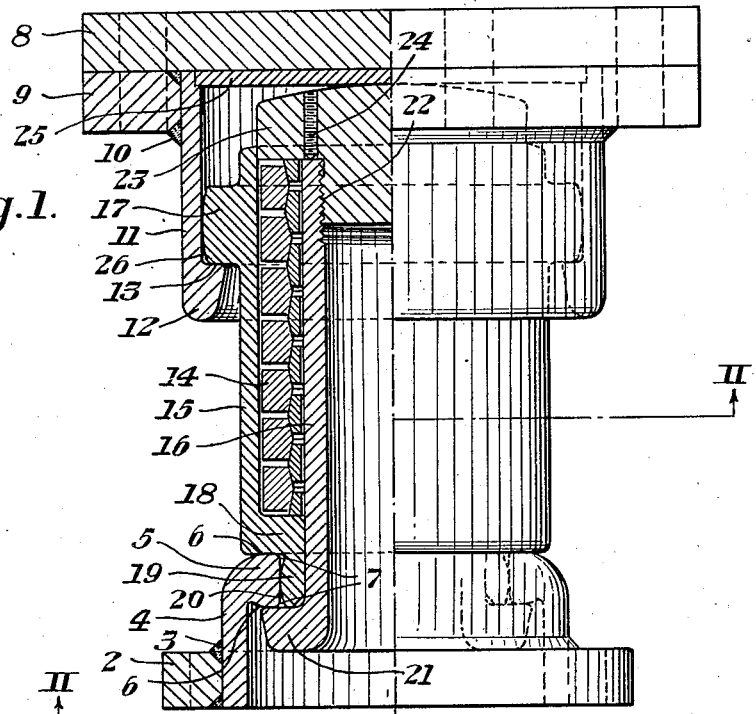
Figure 2:
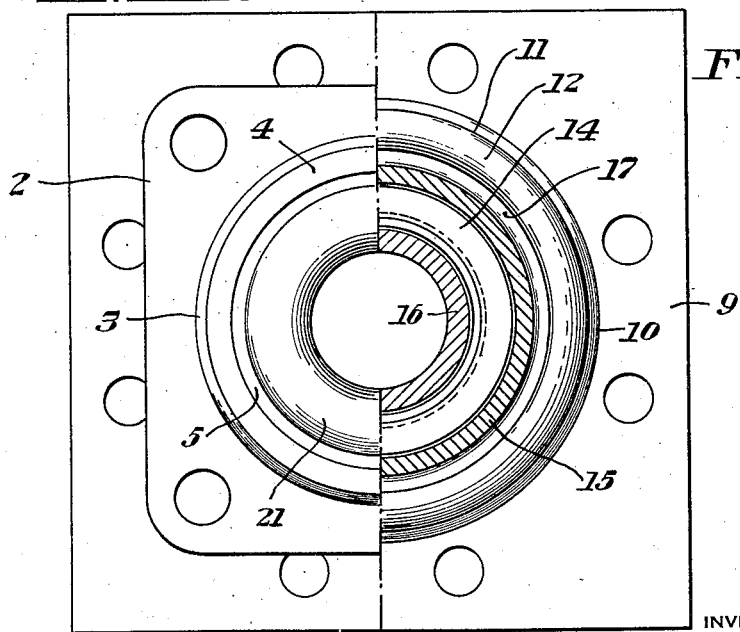

In the accompanying drawing I have shown a present preferred embodiment of the invention in which Figure 1 is a side view, partly in central longitudinal cross section, of a shock absorber, and Figure 2 is an end view of the shock absorber shown in Figure 1, partly in transverse cross section on the line II—II of that figure.

Referring now more particularly to the drawing, 2 denotes a base plate which is suitably fastened to a supporting structure or base. Welded to the base plate 2 at 3 is a supporting ring 4 having at its upper end, viewing Figure 1, an inturned flange 5. The flange 5 has convexly curved upper and lower faces 6 disposed so that the height of the flange gradually increases toward its extremity. The upper and lower edges of the flange are slightly rounded as shown at 7.

Mounted upon the base which carries the base plate 2 through the supporting ring 4 and the other mechanism constituting the shock absorber presently to be described is a device having a mounting portion 8 carrying a ring 9. The device may be any device which it is desired to mount upon the base so that the device will be protected against and spared the full impact of shocks and vibrations imparted to the base. As an example, the device may be a switchboard or electric control panel for use in electrically operated vessels, the base being a portion of the hull or framework of the vessel.

Welded to the ring 9 at 10 is a sleeve 11 having an enlarged extremity 12 forming a shoulder 13 facing upwardly in Figure 1.

The principal operating part of the shock absorber is a spring, illustrated as being a friction spring of the well known ring spring type, designated by reference numeral 14. The characteristics of this type of spring are well known. It acts only in compression and not in tension and absorbs a relatively great amount of energy for comparatively short spring travel. A considerable proportion of the force absorbed by the spring is transformed into heat energy by friction so that the spring has comparatively little rebound. The spring will absorb relatively great stresses for the weight of metal making up the spring.

The spring 14 is carried by a mounting which comprises a housing or sleeve 15 and a mandrel or shank 16. The housing 15 has an outwardly projecting flange 17 near its upper end and an inwardly projecting flange 18 near its lower end. The flange 18 carries a downward projection 19. The outer face of the projection 19 is convexly curved as shown at 20. The mandrel 16 has an outward flange or foot 21 at its lower end and has its upper end internally threaded as shown at 22 to receive a cap 23 projecting outwardly from the mandrel. The cap may be maintained in adjusted position on the mandrel by a set screw 24.

As shown in Figure 1, the cap 23 overlies the spring 14 and the flange 18 underlies the spring. Hence the spring is confined between the housing 15 and the mandrel 16 and opposes relative movement of the housing and mandrel toward each other, i. e. movement of the cap 23 toward the flange 18. The flange 17 of the housing 15 is adapted to rest on the shoulder 13 of the sleeve 11. The outside diameter of the cap 23 is such that the cap is slidingly guided in the upper end of housing 15. Similarly the inside diameter of the flange 18 is such that the lower portion of the mandrel 16 is slidingly guided therewithin. The flange 5 lies between the under surface of the flange 18 and the upper surface of the foot 21 as shown in Figure 1 and opposes the curved face 20 of the projection 19. The flange 18 of the housing 15 and the foot 21 of the mandrel 16, between which the flange 5 of the supporting ring 4 is positioned, limit relative movement between the housing and mandrel away from one another, i. e. movement of the cap 23 away from the flange 18. The top of the cap 23 bears against a plate 25 lying within the upper end of the sleeve 11 and against the mounting portion 8.

When the apparatus is subjected to shocks tending to separate the ring 4 and the sleeve 11 the flange 5 bears downwardly on the foot 21 which moves the mandrel 16 downwardly. The mandrel in turn through the cap 23 compresses the spring 14 against the flange 18. The flange 17 bears downwardly on the shoulder 13.

When the apparatus is subjected to shocks tending to move the ring 4 and the sleeve 11 toward each other the flange 5 bears against the bottom of the flange 18, viewing Figure 1, compressing the spring 14 against the cap 23 which bears against the plate 25.

When the apparatus is subjected to shocks tending to move the ring 4 and the sleeve 11 relatively to each other transversely of the axis of the spring 14 the flange 5 turns relatively to the foot 21, the flange 18 and the curved face 20 of the projection 19. This results in prying apart of the flange 18 and the foot 21, compressing the spring 14.

Thus the shock absorber absorbs shocks to which the apparatus is subjected regardless of the directions of the forces producing the shocks.

The outer face of the flange 17 is spherically curved as shown at 26 and has a diameter such that it is guided within the sleeve 11 when the apparatus is subjected to shocks tending to move the ring 4 and the sleeve 11 relatively to each other transversely of the axis of the spring.

The shock absorber may be used in conjunction with a spring or other resilient mounting between the base and the device mounted thereon and in such case the shock absorber may if desired be provided with a slight initial lost motion which must be taken up before the shock absorber acts. This may be done by providing clearance between the plate 25 and the top of the cap 23 and between the lower surface of the flange 17 and the shoulder 13. When such clearance is provided the shock absorber will not act in response to comparatively minute jars or vibrations as these will be taken up by the spring mounting. Relatively severe shocks or vibrations which are sufficient to more than take up the lost motion in the shock absorber will then be cushioned by the shock absorber itself.

If for example an electric control panel or switchboard in an electrically operated vessel is mounted by the use of my shock absorbers and the vessel is subjected to a violent shock such as may be caused by explosion of a torpedo the shock absorbers will cushion the shock so that the switchboard will remain operative. A switchboard not so mounted might be torn from its mountings which in turn might result in inability to navigate the vessel although otherwise the vessel might remain seaworthy.

While I have shown and described a present preferred embodiment of the invention it is to be distinctly understood that the invention is not limited thereto but may be otherwise variously embodied within the scope of the following claims.

I claim:

1. A shock absorber comprising a shank having spaced apart outward flanges, a sleeve disposed about the shank, the sleeve having portions of different internal diameters, a portion of the sleeve of relatively small internal diameter slidably embracing the shank intermediate the shank flanges, a compression spring disposed between the shank and sleeve at a portion of the sleeve of relatively great internal diameter, the spring bearing at one end against the sleeve and at the other end against one of the shank flanges, an abutment member bearing against an end of the shank, a first housing connected with the abutment member and receiving an end of the sleeve, the sleeve having an outward flange, the first housing having an inward flange adapted to bear against the face of the sleeve flange remote from the abutment member, a second housing at the opposite end of the shock absorber from the first housing, the second housing having an inward flange adapted to bear against the face of the nearer shank flange remote from the end of the shock absorber at which the second housing is disposed and also adapted to bear against a surface of the sleeve facing toward the end of the shock absorber at which the second housing is disposed, the parts being so constructed and arranged that the spring is compressed upon relative movement in any direction of the first and second housings.

2. A shock absorber comprising a shank having spaced apart outward flanges, a sleeve disposed about the shank, the sleeve having portions of different internal diameters, a portion of the sleeve of relatively small internal diameter slidably embracing the shank intermediate the shank flanges and a portion of the sleeve of relatively great internal diameter slidably embracing one of the shank flanges, a compression spring disposed between the shank and sleeve at a portion of the sleeve of relatively great internal diameter, the spring bearing at one end against the sleeve and at the other end against said shank flange, which is slidably embraced by a portion of the sleeve of relatively great internal diameter, an abutment member bearing against an end of the shank, a first housing connected with the abutment member and receiving an end of the sleeve, the sleeve having an outward flange, the first housing having an inward flange adapted to bear against the face of the sleeve flange remote from the abutment member, a second housing at the opposite end of the shock absorber from the first housing, the second housing having an inward flange adapted to bear against the face of the nearer shank flange remote from the end of the shock absorber at which the second housing is disposed and also adapted to bear against a surface of the sleeve facing toward the end of the shock absorber at which the second housing is disposed, the parts being so constructed and arranged that the spring is compressed upon relative movement in any direction of the first and second housings.

3. A shock absorber comprising a shank having spaced apart outward flanges and having a convex spherically shaped end, a sleeve disposed about the shaft, the sleeve having portions of different internal diameters, a portion of the sleeve of relatively small internal diameter slidably embracing the shank intermediate the shank flanges, a compression spring disposed between the shank and sleeve at a portion of the sleeve of relatively great internal diameter, the spring bearing at one end against the sleeve and at the other end against one of the shank flanges, an abutment member bearing against said end of the shank, a first housing connected with the abutment member and receiving an end of the sleeve, the sleeve having an outward flange, the first housing having an inward flange adapted to bear against the face of the sleeve flange remote from the abutment member, a second housing at the opposite end of the shock absorber from the first housing, the second housing having an inward flange adapted to bear against the face of the nearer shank flange remote from the end of the shock absorber at which the second housing is disposed and also adapted to bear against a surface of the sleeve facing toward the end of the shock absorber at which the second housing is disposed, the parts being so constructed and arranged that the spring is compressed upon relative movement in any direction of the first and second housings.

4. A shock absorber comprising a shank having spaced apart outward flanges, a sleeve disposed about the shank, the sleeve having portions of different internal diameters, a portion of the sleeve of relatively small internal diameter slidably embracing the shank intermediate the shank flanges, one end of the sleeve being of reduced external diameter, a compression spring disposed between the shank and sleeve at a portion of the sleeve of relatively great internal diameter, the spring bearing at one end against the sleeve and at the other end against one of the shank flanges, an abutment member bearing against an end of the shank, a first housing connected with the abutment member and receiving an end of the sleeve, the sleeve having an outward flange, the first housing having an inward flange adapted to bear against the face of the sleeve flange remote from the abutment member, a second housing at the opposite end of the shock absorber from the first housing, the second housing having an inward flange adapted to bear against the face of the nearer shank flange remote from the end of the shock absorber at which the second housing is disposed and also adapted to bear against the radially outer surface of the end of the sleeve of reduced external diameter and against a surface of the sleeve facing toward the end of the shock absorber at which the second housing is disposed so that the second housing flange bears axially against the nearer shank flange and bears radially and axially against the sleeve, the parts being so constructed and arranged that the spring is compressed upon relative movement in any direction of the first and second housings.

5. A shock absorber comprising a shank having adjacent one end an outward flange and at the opposite end a cap of greater diameter than the shank connected with the shank, a sleeve disposed about the shank, the sleeve having portions of different internal diameters, a portion of the sleeve of relatively small internal diameter slidably embracing the shank between the shank flange and cap, a compression spring disposed between the shank and sleeve at a portion of the sleeve of relatively great internal diameter, the spring bearing at one end against the sleeve and at the other end against the cap, an abutment member bearing against the cap, a first housing connected with the abutment member and receiving an end of the sleeve, the sleeve having an outward flange, the first housing having an inward flange adapted to bear against the face of the sleeve flange remote from the abutment member, a second housing at the opposite end of the shock absorber from the first housing, the second housing having an inward flange adapted to bear against the face of the shank flange remote from the end of the shock absorber at which the second housing is disposed and also adapted to bear against a surface of the sleeve facing toward the end of the shock absorber at which the second housing is disposed, the parts being so constructed and arranged that the spring is compressed upon relative movement in any direction of the first and second housings.

6. A shock absorber comprising a shank having spaced apart outward flanges, a sleeve disposed about the shank, the sleeve having portions of different internal diameters, a portion of the sleeve of relatively small internal diameter slidably embracing the shank intermediate the shank flanges, a friction spring disposed between the shank and sleeve at a portion of the sleeve of relatively great internal diameter, the spring bearing at one end against the sleeve and at the other end against one of the shank flanges, an abutment member bearing against an end of the shank, a first housing connected with the abutment member and receiving an end of the sleeve, the sleeve having an outward flange, the first housing having an inward flange adapted to bear against the face of the sleeve flange remote from the abutment member, a second housing at the opposite end of the shock absorber from the first housing, the second housing having an inward flange adapted to bear against the face of the nearer shank flange remote from the end of the shock absorber at which the second housing is disposed and also adapted to bear against a surface of the sleeve facing toward the end of the shock absorber at which the second housing is disposed, the parts being so constructed and arranged that the spring is compressed upon relative movement in any direction of the first and second housings.

7. A shock absorber comprising a shank having adjacent one end an outward flange and at the opposite end a cap of greater diameter than the shank connected with the shank, the cap having a convex spherically shaped end, the sleeve having portions of different internal diameters, a portion of the sleeve of relatively small internal diameter slidably embracing the shank between the shank flange and cap and a portion of the sleeve of relatively great internal diameter slidably embracing the cap, one end of the sleeve being of reduced external diameter, a friction spring disposed between the shank and sleeve and a portion of the sleeve of relatively great internal diameter, the spring bearing at one end against the sleeve and at the other end against the cap, an abutment member bearing against the convex spherically shaped end of the cap, a first housing connected with the abutment member and receiving an end of the sleeve, the sleeve having an outward flange, the first housing having an inward flange adapted to bear against the face of the sleeve flange remote from the abutment member, a second housing at the opposite end of the shock absorber from the first housing, the second housing having an inward flange adapted to bear against the face of the shank flange remote from the end of the shock absorber at which the second housing is disposed and also adapted to bear against the radially outer surface of the end of the sleeve of reduced external diameter and against a surface of the sleeve facing toward the end of the shock absorber at which the second housing is disposed so that the second housing flange bears axially against the shank flange and bears radially and axially against the sleeve, the parts being so constructed and arranged that the spring is compressed upon relative movement in any direction of the first and second housings.

OSCAR R. WIKANDER.